Dec. 28, 1937.     E. LUSCHINSKY     2,103,858

AUTOMOBILE VEHICLE FOR FORWARD AND BACKWARD TRAVEL

Filed Jan. 15, 1936

Eugen Luschinsky
INVENTOR

BY
ATTORNEY

Patented Dec. 28, 1937

2,103,858

UNITED STATES PATENT OFFICE 2,103,858

AUTOMOBILE VEHICLE FOR FORWARD AND BACKWARD TRAVEL

Eugen Luschinsky, Vienna, Austria

Application January 15, 1936, Serial No. 59,177
In Austria February 2, 1935

9 Claims. (Cl. 280—87)

This invention relates to power driven vehicles and more particularly to military vehicles such as armoured cars.

Power driven vehicles have been proposed having an optical arrangement provided within reach of the driver who sits in front of the vehicle, by means of which the driver is able, without turning his head or body, to obtain a view of the country behind him, so that, without altering his position, the driver can steer the vehicle from his seat during the forward as well as the rearward travel of the vehicle.

The present invention has for its object to enable the driver sitting in front and looking forward to effect the steering of the vehicle during the rearward travel thereof (in spite of the reversal in the direction of travel) in the same manner and with the same steering movements as during forward travel. It is to be understood that when the vehicle is travelling forwards and the driver turns the steering wheel to the right, it will describe a right-hand curve. When the vehicle is travelling backwards and the driver turns the steering wheel also to the right, it will describe a curve which, viewed from the seat of the driver and the position of his body, may be termed a right-hand curve. With respect to the direction of travel, however, it is a left-hand curve. As the driver sits facing the main direction of travel, therefore reversed to the backward direction of travel, he will optically have the impression that a left-hand curve viewed in the backward travelling direction is actually a left-hand curve, although with regard to the position in which he is sitting this left-hand curve may be regarded as a right-hand curve. It is therefore necessary during rearward travel for the driver, since he is sitting facing the main direction of travel, that is to say facing forwards, to be able to effect the steering movement of the steering wheel, which agrees with the optical impression, so as to steer the vehicle into the intended curve. This steering movement is, however, opposite to that required for normal driving.

According to the invention a reversing gear, which can be put into and out of operation, is fitted in the steering gear, preferably in the steering column, the said reversing gear being put into operation during rearward travel and reversing the steering motion produced by the hand wheel, so that also in the case of rearward travel the optical impression obtained by looking at the path of travel will serve as a correct guide for initiating the steering movements as in the case of forward travel. Such an arrangement may readily be so constructed that the reversing member for reversing the steering motion for rearward travel is connected up to the reverse lever of the driving gear (change speed gear or the like) that when the direction of travel is reversed the steering reverse gear is also put into operation, the optical arrangement being optionally coupled with the steering reverse gear so that the adjustment of the optical arrangement for rearward travel is effected at the same time that the steering gear is changed over for rearward travel. Such a construction ensures that with the change in the direction of travel the change over of the reversing gear in the steering gear and the optical arrangement is effected positively and the driver is free to give his entire attention to observing the path of travel.

A preferred constructional form of the invention is one having a binocular optical arrangement not only for the purpose of providing stereoscopic vision but more particularly for enabling distances and the like to be gauged. Such a binocular optical arrangement for instance may comprise two telescopes, one for each eye, the said telescopes being arranged at a distance apart from one another in dependence on the field of vision, preferably in such a manner that stereoplastic vision is possible in the manner to which the human eye is accustomed.

A constructional form of the invention is shown diagrammatically by way of example as applied to an armoured car.

Figure 3:
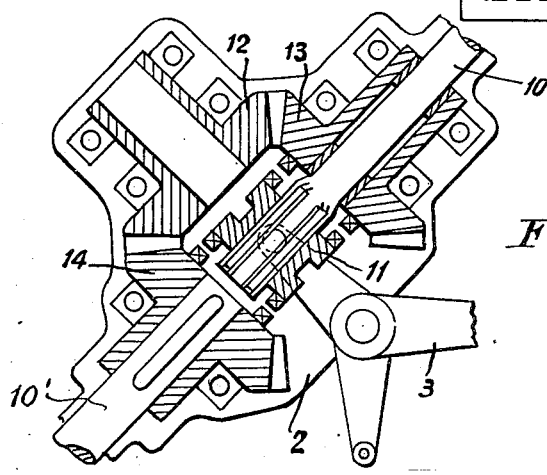
Fig. 3 is an enlarged sectional detail of the reversing gear.

Referring to the drawing, 1 is the steering wheel, 2 the reversing gear mounted in the steering column and 3 is the reversing lever by means of which the reversing gear for the steering gear is put into and out of operation. The reversing gear is shown in Figure 3 on a larger scale. By means of a claw clutch 11 which is slidable on the grooved end of the steering column 10 and which can be actuated by means of one arm of the reversing lever 3, the steering motion of the steering column can be reversed through the intermediary of the bevel gears 12, 13, and 14 which connect up the steering column with a shaft 10' (e. g. during rearward travel) the steering column being, however, adapted to be coupled up directly to the shaft 10' through the claw clutch 11 (e. g. during forward travel).

The reversing lever 3 is connected up by means of a connecting rod 4 with a change over lever 5 for an optical arrangement provided with an apparatus 6 (e. g. telescopes or the like) for looking backwards. 7, 7', 7'', 7''', 7'''' are mirrors or prisms which transmit the rays of light from behind to the eye of the driver after circumventing any structural parts of the vehicle which may lie in the way, such as for instance in the constructional example shown in the drawing, a turret fitted on the vehicle. 8, 8 are two light inlet openings for the binocular optical arrangement arranged symmetricaly with respect to the longitudinal axis. 9, 9 are direction indicating marks on the vehicle which lie in the field of view and which enable the position of the vehicle with respect to the path of travel to be always correctly gauged and steering to be correctly effected. These marks may be provided on the mudguards; the searchlights or the like may be provided with other marks. Preferably the means for connecting up the optical arrangement for rearward viewing or for changing over the forward to rearward viewing is coupled up with the change over lever 3 of the reversing gear of the steering gear in such a manner that both change over movements are effected positively and simultaneously. This positive interconnection can be carried still further by combining the change over lever 3 of the reversing gear for the steering wheel mechanism with the reverse lever of the change speed gear in such a manner that when the direction of travel is reversed by actuating the said reverse lever or gear change lever the reversing gear for the steering gear and the optical arrangement are actuated simultaneously and changed over.

The position of the two telescopes forming the light inlet openings 8 of the binocular optical arrangement and which are again united behind the driver is preferably set in dependence on the field of view in such a manner that the two openings can lie side by side in sufficient proximity to one another to avoid any exaggerated stereoscopic effect, while notwithstanding this the direction indicating marks 9 will still lie in the field of vision. This is necessary in order that the driver may be able at all times to judge the position of his vehicle with respect to the limits of the track on which the vehicle is travelling. The light inlet openings 8 may be arranged at a suitable point on the rear wall in such a manner that they may be kept as small as possible and only leave the minimum possible unprotected space open.

Figure 1:
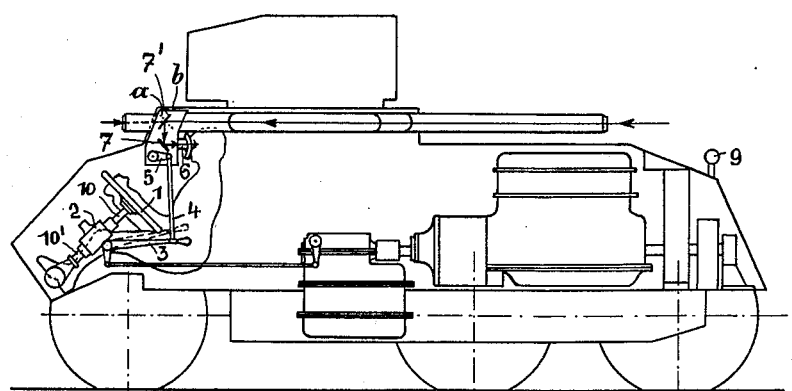
Fig. 1 is a side view of a vehicle embodying the present invention.
Figure 2:
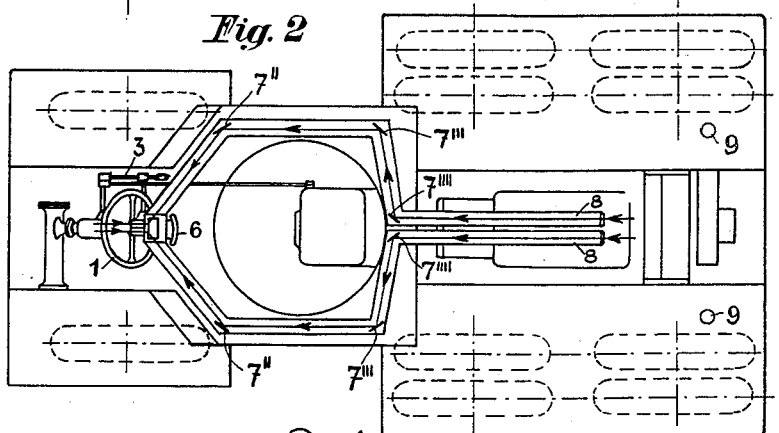
Fig. 2 is a plan view thereof.

In Fig. 1 the position $b$ of the mirror shown in full lines corresponds to the rearward travel of the vehicle and the position $a$ of the mirror shown in broken lines corresponds to the forward travel.

The means 6 for looking rearward (e. g. the telescopes or the like) are either so constructed that they may be removed or folded aside during the forward travel so that an unobsructed forward view is possible or they may be so constructed by the provision of a reversing prism or a tilting mirror arrangement of any desired construction that they will permit the driver to look forwardly or rearwardly.

In some cases the optical arrangement may comprise simple mirrors.

The optical arrangement may extend rearwardly above the driver, laterally of the driver or below the driver.

What I claim is:

1. In a power driven vehicle having a steering gear and adapted for travelling forwardly and rearwardly, the combination of an optical viewing device for the driver having change over means for enabling the driver to see optionally in front or behind him without turning his head or body, and a reversing gear interposed in the steering gear for changing over the steering movement produced during the actuation of the steering gear by the driver, said reversing gear being adapted to be placed into and out of operation and having means operatively connected to the change over means of the optical viewing device for changing over the steering movement simultaneously with the change over of the optical viewing device from forward to rearward viewing.

2. In a power driven vehicle adapted for forward and rearward travel and having a steering gear with a steering column, the combination of an optical viewing device for enabling the driver of the vehicle to see behind him without turning his head or body and a reversing gear interposed in the steering gear and mounted in the steering column for changing over the steering movement produced during actuation of the steering gear, said reversing gear being capable of being placed into and out of operation so as to enable the steering movement to be changed over during travel of the vehicle in the rearward direction.

3. In a power driven vehicle having a steering gear and adapted for travelling forwardly and rearwardly, the combination of an optical viewing device for the driver having change over means for enabling the driver to see optionally in front of or behind him without turning his head or body, and reversing gear interposed in the steering gear for changing over the steering movement produced during the actuation of the steering gear by the driver, a reversible drive mechanism including a reversing lever for reversing the direction of travel of the vehicle, said reversing lever being operatively connected to the reversing gear for the steering gear so as to change over the steering movement when the vehicle drive is reversed.

4. In a power driven vehicle having a steering gear and adapted for travelling forwardly and rearwardly, the combination of an optical viewing device for the driver having change over means for enabling the driver to see optionally in front of or behind him without turning his head or body, a reversing gear interposed in the steering gear for changing over the steering movement produced during the actuation of the steering gear by the driver, a change over speed and reverse gear drive having a gear shift lever for changing the speed and reversing the direction of travel of the vehicle, said gear shift lever being operatively connected to the reversing gear for the steering gear so as to change over the steering movement when the vehicle is reversed.

5. In a power driven vehicle having a steering gear, and adapted for travelling forwardly and rearwardly, the combination of an optical viewing device for the driver, a reversing gear interposed in the steering gear for changing over the steering movement produced during the actuation of the steering gear by the driver, said reversing gear being adapted to be placed into and out of operation so as to enable the steering movements to be changed over during travel of the vehicle in the rearward direction, said optical viewing device being adapted for viewing forwardly or rearwardly and having change over means for enabling the driver to see in front of or behind him without turning his head or body.

6. In a power driven vehicle having a steering gear and adapted for travelling forwardly and rearwardly, the combination of an optical viewing device for the driver, a reversing gear interposed in the steering gear for changing over the steering movement produced during the actuation of the steering gear by the driver, said reversing gear being adapted to be placed into and out of operation so as to enable the steering movements to be changed over during the travel of the vehicle in the rearward direction and a reversing prism interposed in the optical viewing device for enabling the driver to see in front of or behind him without turning his head or body.

7. In a power driven vehicle having a steering gear and adapted for travelling forwardly and rearwardly, the combination of an optical viewing device for the driver, a reversing gear interposed in the steering gear for changing over the steering movement produced during the actuation of the steering gear by the driver, said reversing gear being adapted to be placed into and out of operation so as to enable the steering movement to be changed over during the travel of the vehicle in the rearward direction and a tiltable mirror interposed in the optical viewing device for enabling the driver to see in front of or behind him without turning his head or body.

8. In a power driven vehicle having a steering gear and adapted for travelling forwardly and rearwardly, the combination of an optical viewing device for the driver, a reversing gear interposed in the steering gear for changing over the steering movement produced during the actuation of the steering gear by the driver, said reversing gear being adapted to be placed into and out of operation so as to enable the steering movement to be changed over during the travel of the vehicle in the rearward direction, said optical viewing device being of a binocular type and having two light inlets spaced apart so as to produce a stereoscopic effect approximating to that to which the human eye is accustomed.

9. In a power driven vehicle having a steering gear and adapted for travelling forwardly and rearwardly, the combination of an optical viewing device for enabling the driver of the vehicle to see behind him without turning his head or body and a reversing gear interposed in the steering gear for changing over the steering movement produced during actuation of the steering gear, the said reversing gear during rearward travel changing over the steering movement effected by the steering gear so that during rearward travel the same steering movements can be performed by the driver as during forward travel.

EUGEN LUSCHINSKY.